US010650785B1

(12) United States Patent
Tuomisto et al.

(10) Patent No.: US 10,650,785 B1
(45) Date of Patent: May 12, 2020

(54) COLOR MANAGEMENT OF DISPLAY DEVICE

(71) Applicant: Microsoft Technology Licensing, LLC, Redmond, WA (US)

(72) Inventors: Pietari Tuomisto, Redmond, WA (US); William J. Cummings, Clinton, WA (US); Dmitry Reshidko, Sammamish, WA (US); Tuomas Vallius, Kirkland, WA (US); David Douglas Bohn, Fort Collins, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/281,778

(22) Filed: Feb. 21, 2019

(51) Int. Cl.
| | |
|---|---|
| *G09G 5/02* | (2006.01) |
| *G09G 3/02* | (2006.01) |
| *G06T 7/30* | (2017.01) |
| *G09G 3/00* | (2006.01) |
| *G09G 3/32* | (2016.01) |
| *G06T 7/70* | (2017.01) |

(52) U.S. Cl.
CPC .............. *G09G 5/026* (2013.01); *G06T 7/30* (2017.01); *G06T 7/70* (2017.01); *G09G 3/002* (2013.01); *G09G 3/02* (2013.01); *G09G 3/32* (2013.01); *G09G 2320/0666* (2013.01); *G09G 2320/0693* (2013.01); *G09G 2340/0407* (2013.01); *G09G 2340/0464* (2013.01); *G09G 2340/0492* (2013.01); *G09G 2340/08* (2013.01); *G09G 2340/12* (2013.01)

(58) Field of Classification Search
None
See application file for complete search history.

(56) References Cited

U.S. PATENT DOCUMENTS

| | | | |
|---|---|---|---|
| 9,274,338 B2 | 3/2016 | Robbins et al. | |
| 9,627,437 B1* | 4/2017 | Ulmer | H01L 27/156 |
| 9,715,067 B1 | 7/2017 | Brown et al. | |

(Continued)

OTHER PUBLICATIONS

"The Future of MicroLED Displays using Next-Generation Technologies", In White Paper of Plessey, 5 Pages, Mar. 2018.

(Continued)

*Primary Examiner* — Frank S Chen
(74) *Attorney, Agent, or Firm* — Arent Fox LLP

(57) ABSTRACT

MicroLED arrays offer a small form factor solution for the HMD image sources since they do not need a separate illumination optics. Features of the present disclosure implement a MicroLED display system that incorporate a plurality of monochrome projectors (e.g., three MicroLED projectors) to generate three monochrome images (e.g., red, blue, and green images) that are separately input into a single waveguide of the HMD and combined to form an image that is displayed to the user. By utilizing a single waveguide that includes a plurality of spatially separated input regions (e.g., a region for inputting blue light, a region for inputting red light, a region for inputting green light), the MicroLED display system of the present disclosure may reduce the form factor of the HMD device because of the reduced number of plates that may be required to combine the three monochrome images.

19 Claims, 8 Drawing Sheets

(56) References Cited

U.S. PATENT DOCUMENTS

| | | |
|---|---|---|
| 2003/0160706 A1* | 8/2003 | Endress ............. B64D 11/0015 |
| | | 340/945 |
| 2010/0134520 A1* | 6/2010 | Coe-Sullivan ......... B82Y 20/00 |
| | | 345/690 |
| 2011/0242661 A1 | 10/2011 | Simmonds |
| 2014/0232759 A1 | 8/2014 | Simmonds et al. |
| 2016/0252724 A1 | 9/2016 | Nikkhoo |
| 2017/0184776 A1* | 6/2017 | El-Ghoroury .......... G02B 27/22 |
| 2018/0131926 A1 | 5/2018 | Shanks et al. |
| 2018/0182275 A1 | 6/2018 | Ahmed et al. |
| 2018/0284460 A1 | 10/2018 | Cheng et al. |
| 2019/0227319 A1 | 7/2019 | Trail et al. |

OTHER PUBLICATIONS

Kress, et al., "Diffractive and Holographic Optics as Optical Combiners in Head Mounted Displays", In Proceedings of the ACM Conference on Pervasive and Ubiquitous Computing Adjunct Publication, pp. 1479-1482, Sep. 8, 2013.

"Non Final Office Action Issued in U.S. Appl. No. 16/281,805", dated Mar. 18, 2020, 13 Pages.

Strickland, Keith, "The future of MicroLED Displays using Next-generation Technologies", In SID Symposium Digest of Technical Papers, vol. 49, Issue 1, May 2018, pp. 696-697.

* cited by examiner

COLOR MANAGEMENT OF DISPLAY DEVICE

BACKGROUND

The present disclosure relates to computer graphics systems, and more particularly, to a Micro light emitting diode (MicroLED) display system and the color management of the display device.

One area of computing devices that has grown in recent years is the area of virtual reality (VR) and augmented reality (AR) devices, which use a graphics processing unit (GPU) to render graphics from a computing device to a display device. Such technology may be incorporated into a head-mounted display (HMD) device in the form of eyeglasses, goggles, a helmet, a visor, or other eyewear. As used herein, a HMD device may include a device that generates and/or displays virtual reality images (e.g., from at least one virtual environment input), and/or mixed reality (MR) images or augmented reality (AR) images (e.g., from at least one virtual environment input and one real environment input). In such devices, a scene produced on a display device can be oriented or modified based on user input (e.g., movement of a gamepad button or stick to cause movement of the orientation of the scene, introduction of items into the scene, etc.).

One challenge with incorporating display devices into HMD or mobile devices is the size constraints that limit some of the optical or display components that can be integrated into the HMD devices while miniaturizing the overall size of the HMD devices to improve user mobility. Current HMDs usually use illuminated micro displays such as reflective liquid crystal on silicon (hereafter "LCoS") or digital light processing (DLP) projectors as they provide a high standard of display performance. These displays offer advantages such as high resolution, a wide color gamut, high brightness and a high contrast ratio. However, such digital projection systems that rely on LCoS or DLP technology require large form factors to create a uniform illumination of panels. Thus, there is a need in the art for improvements in presenting images on a display with miniaturized components without compromising the display quality or user experience.

SUMMARY

MicroLED arrays offer a small form factor solution for the HMD image sources since they do not need separate illumination optics. Features of the present disclosure implement a MicroLED display system that incorporates a plurality of monochrome projectors (e.g., three MicroLED projectors) to generate three monochrome images (e.g., red, blue, and green images) that are separately input into a single waveguide of the HMD and combined to form an image that is displayed to the user. By utilizing a single waveguide that includes a plurality of spatially separated input regions (e.g., a region for inputting blue light, a region for inputting red light, and a region for inputting green light), the MicroLED display system of the present disclosure may reduce the form factor of the HMD device because of the reduced number and/or size of optical components, such as a reduced number of plates that may be required to combine the three monochrome images.

In one example, a display device is disclosed. The display device may include an optical waveguide having a plurality of input regions for receiving at least a portion of light corresponding to an image, wherein the plurality of input regions include at least a first input region, a second input region, and a third input region. The display device may also include a plurality of monolithic micro light emitting diode (MicroLED) projectors that each generate a different monochrome color version of the image. In some examples, the plurality of MicroLED projectors may include at least a first projector generating a first version of the image in a first color, a second projector generating a second version of the image in a second color, and a third projector generating a third version of the image in a third color. In some aspects, the first input region of the optical waveguide may be physically aligned with the first projector to receive light corresponding to the first version of the image, the second input region of the optical waveguide may be physically aligned with the second projector to receive light corresponding to the second version of the image, and the third input region of the optical waveguide may be physically aligned with the third projector to receive light corresponding to the third version of the image. In some examples, the optical waveguide may further include an output region configured to guide light from each of the plurality of MicroLED projectors toward a target to make a final image visible to user, wherein the final image is a fully colored image that combines the different monochrome color versions of the image.

In another example, a method for displaying an image on a display device is disclosed. The method may include generating a plurality of monochrome color versions of an image using a plurality of monolithic MicroLED projectors, wherein the plurality of MicroLED projectors includes at least a first projector generating a first version of the image in a first color, a second projector generating a second version of the image in a second color, and a third projector generating a third version of the image in a third color. The method may further include receiving, at an optical waveguide, light inputs from each of the plurality of MicroLED projectors into a plurality of different input regions of the optical waveguide such that a first input region of the optical waveguide is physically aligned with a first color projector to receive light corresponding to the first version of the image, the second input region of the optical waveguide is physically aligned with the second color projector to receive light corresponding to the second version of the image, and the third input region of the optical waveguide is physically aligned with the third color projector to receive light corresponding to the third version of the image. The method may further include outputting, through the optical waveguide, light from each of the plurality of MicroLED projectors toward a target to make a final image visible to user, wherein the final image is a fully colored image that combines the plurality of monochrome color versions of an image.

In another example, another method for calibrating an image on a display device is disclosed. The method may include detecting, at a camera, light rays output from an optical waveguide, wherein the light rays correspond to a plurality of monochrome color versions of an image generated by a plurality of monolithic MicroLED projectors. The method may further include determining a first position of a first version of the image from the plurality of monochrome color versions of the image, wherein the first version of the image is generated in first monochrome color by a first projector. The method may further include determining a second position of a second version of the image from the plurality of monochrome color versions of the image, wherein the second version of the image is generated in second monochrome color by a second projector. The method may further include measuring an image displacement between the first position of the first version of the image and the second position of the second version of the image to calculate an offset value between the first position and the second position, wherein the image displacement is one or both of lateral displacement or angular rotational displacement. The method may further include configuring the display device to adjust at least one image output parameter of the plurality of MicroLED projectors such that the output from the optical waveguide of the plurality of monochrome color versions of the image have an overlapping alignment that meets an alignment threshold.

In another example, an apparatus for calibrating an image on a display device is disclosed. The apparatus may include a memory to store data and instructions. The apparatus may further include a processor in communication with the memory to execute the instructions to detect, at a camera, light rays output from an optical waveguide, wherein the light rays correspond to a plurality of monochrome color versions of an image generated by a plurality of monolithic MicroLED projectors. The apparatus may further include instructions to determine a first position of a first version of the image from the plurality of monochrome color versions of the image, wherein the first version of the image is generated in first monochrome color by a first projector. The apparatus may further include instructions to determine a second position of a second version of the image from the plurality of monochrome color versions of the image, wherein the second version of the image is generated in second monochrome color by a second projector. The apparatus may further include instructions to measure an image displacement between the first position of the first version of the image and the second position of the second version of the image to calculate an offset value between the first position and the second position, wherein the image displacement is one or both of lateral displacement or angular rotational displacement. The apparatus may further include instructions to configure the display device to adjust at least one image output parameter of the plurality of MicroLED projectors such that the output from the optical waveguide of the plurality of monochrome color versions of the image have an overlapping alignment that meets an alignment threshold.

The above presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DESCRIPTION OF THE FIGURES

The disclosed aspects of the present disclosure will hereinafter be described in conjunction with the appended drawings, provided to illustrate and not to limit the disclosed aspects, wherein like designations denote like elements, where a dashed line may indicate an optional component, and in which.

DETAILED DESCRIPTION

Figure 1A:
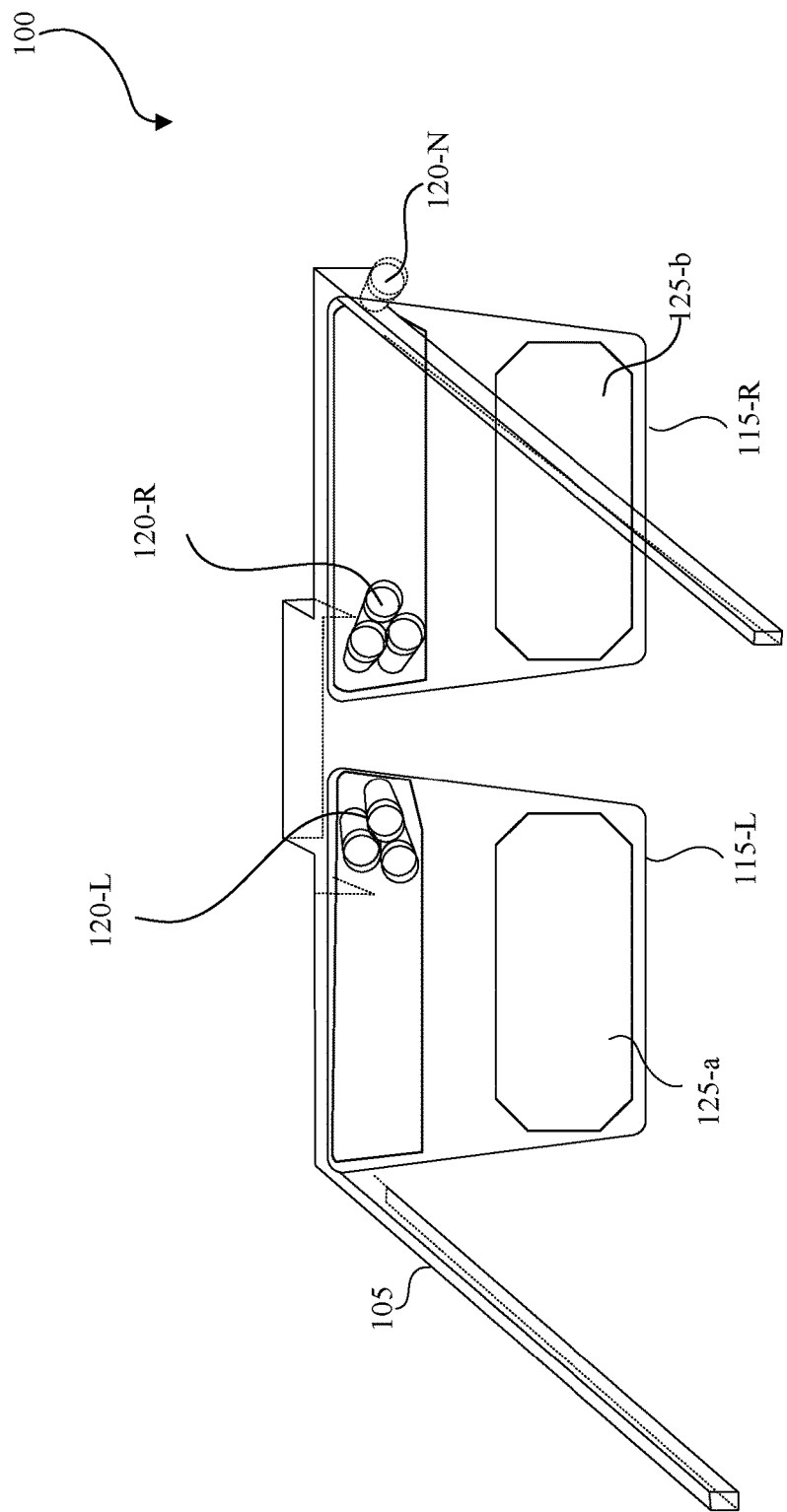
FIG. 1A is a schematic diagram of a display device (e.g., HMD device) in accordance with an implementation of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure provides devices and methods for presentation of images such as virtual reality (VR) or mixed reality (MR)/augmented reality (AR) images on a display that is incorporated into mobile display devices, such as displays implemented for head mounted display (HMD). It should be appreciated by those of ordinary skill in the art that while the present disclosure references HMD, the display techniques implemented herein may be adaptable for any mobile device, including but not limited to, mobile phones, tablets, or laptops.

As discussed above, one challenge with incorporating display devices into mobile devices is the size constraints that limit the components that can be integrated into the display systems while miniaturizing the overall size of the HMD devices or mobile display to improve user mobility. Current HMDs generally use illuminated micro displays such as reflective LCoS or DLP projectors as they provide a high standard of display performance. While these displays offer advantages such as high resolution, a wide color gamut, high brightness and a high contrast ratio, such digital projection systems that rely on LCoS or DLP technology also require large form factors to create a uniform illumination of panels.

In contrast, MicroLED arrays offer a small form factor solution for the HMD image sources since they do not need separate illumination optics. However, the materials required to create semiconductors with either blue-green or red LEDs are generally incompatible in the manufacturing process of LEDs for specific colors (e.g., Indium, Gallium and Nitrogen (InGaN) to produce green, blue and white colors and/or Aluminum Gallium Arsenide (AlGaAs) used to generate red and amber portions of the visible spectrum). Specifically, from the manufacturing perspective, it may be difficult to get all three colors into the same array without either the labor intensive process of picking and placing each LED individually or developing an expensive growth/lithography process.

One solution to the above-identified problem with MicroLED micro displays may be to separate each of the red, green, and blue arrays and combine the different colors with optics. However, optical combiners require large prism cubes to combine three different images together and relay optics to prevent the divergence of the pixels when combining the colors. Thus, such optical systems increase the optics footprint and prevent small form factor HMD development with micro LEDs. Furthermore, the divergence angle of the microLEDs may be so large (E.g., +/−40 degrees) that it may impact the optical power.

Features of the present disclosure implement a MicroLED display system that incorporates a plurality of monochrome projectors (e.g., three MicroLED projectors) to generate three monochrome images (e.g., red, blue, and green images) that are separately input into a single waveguide of the HMD and combined to form an image that is displayed to the user. By utilizing a single waveguide that includes a plurality of spatially separated input regions (e.g., a region for inputting blue light, a region for inputting red light, a region for inputting green light), the MicroLED display system of the present disclosure may reduce the size and form factor of the HMD device because of the reduced number of plates that may be required to combine the three monochrome images and/or because of the reduced number of size of the optical components. However, it should be appreciated by those of ordinary skill in the art that the features of the present disclosure are not limited to plurality of projectors generating monochrome images. Instead, in some examples, a single projector without external illumination may also generate and input the full color image into the waveguide. Such system would provide benefit of simplistic hardware and reduced form factor in comparison to the current digital projection systems that rely on LCoS or DLP technology that require large form factors to create a uniform illumination of panels.

Specifically, in accordance with aspects of the present disclosure, waveguides with gratings may provide a mechanism to combine several images together with the smallest possible form factor. With a separate microLED display for each primary color, the exit pupil of each image/color may be coupled into a single optical waveguide that brings the pupils on top of each other using pupil replication. Further, since the waveguide may be designed to act as a pupil expander of an augmented reality (AR) display, the same optical waveguide may be used to relay the image into the user's eye, thereby saving on additional hardware by using the same integrated waveguide to combine the three colors together and to act as an AR-display. This may include configuring the waveguide to steer the incoming field-of-view (FoV) at least into two or more directions in order to enable pupil expansion with a large FoV.

Additional advantages of the present disclosure may be the hardware simplicity that is required for HMD. For example, by incorporating a plurality of monochrome projectors (e.g., three MicroLED projectors) to generate three monochrome images (e.g., red, blue, and green images) that are separately input into a single waveguide of the HMD, the optics of each MicroLED projectors may be simpler because no mirrors or doublet lenses may be needed to avoid or correct chromatic aberration.

In addition, in some implementations, the present disclosure may further reduce the form factor of the HMD by implementing a color management scheme that may include modifying the color resolution of each MicroLED projector. Specifically, the physical size of the MicroLED projector may depend on the resolution/pixel count of the imaging system. Recognizing that the human eye has the highest sensitivity for green light, the overall form factor of the HMD may be further reduced by lowering the color resolution of blue and/or red colors, while increasing the color resolution of green light for full resolution. To this end, due to lower color resolution requirements of one or more colors (blue and/or red color images), features of the present disclosure may further reduce the size and complexity of hardware of the monolithic MicroLED projectors. Thus, the lower color resolution of the blue and/or red colors may be compensated by a higher resolution of green color to provide a user with a full resolution image while benefiting from reduced form factor of the overall display system. Although the above example discusses lowering the color resolution of blue and/or red color images, it should be appreciated that the modification of the color resolution is not limited to only blue and/or red colors, but instead may be adapted for any number of colors. Additionally, in some examples, the techniques of the present disclosure may be applied to lowering the color resolution of only one color.

Finally, features of the present disclosure also provide techniques of calibrating the image to be displayed via the optical guide by configuring one or more MicroLED projectors. For example, any mechanical mounting issues with the MicroLED projectors may change the angle of the projected image, which in turn may cause pixels from that MicroLED projector to be in misplaced. Thus, any displacement between the three monochrome images may result in a blurry image being displayed on the display device. One technique to solve this problem may include manipulating the incoming image in order to pre-correct the location of one or more pixels in order to account for any disparity. Thus, in some aspects of the manufacturing process, a calibration procedure may be implemented that may utilize a camera to be placed in front of the optical waveguide (e.g., where a user's eye would otherwise be) to identify how each color field is separated from one another, and to provide configuration parameters to calibrate the image from the three MicroLED projectors such that the three images overlap, generating a cohesive final image to be displayed. To this end, features of the present disclosure may include techniques for pre-rotating and offsetting at least one of the three monochromic images to correct for any misalignment in the mechanical assembly of the display device, including the MicroLED projectors.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1B:
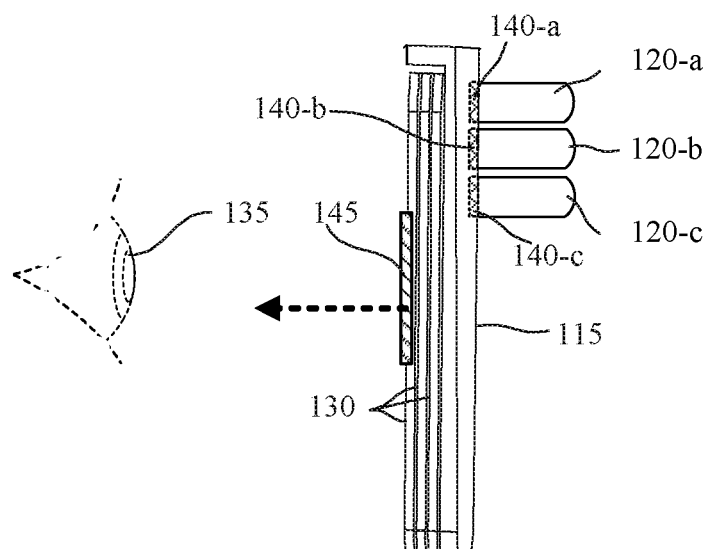
FIGS. 1B and 1C are a schematic diagram of a side view of the display device, and more particularly the waveguide aligned with a plurality of monochrome MicroLED projectors in accordance with an implementation of the present disclosure.
Figure 1C:
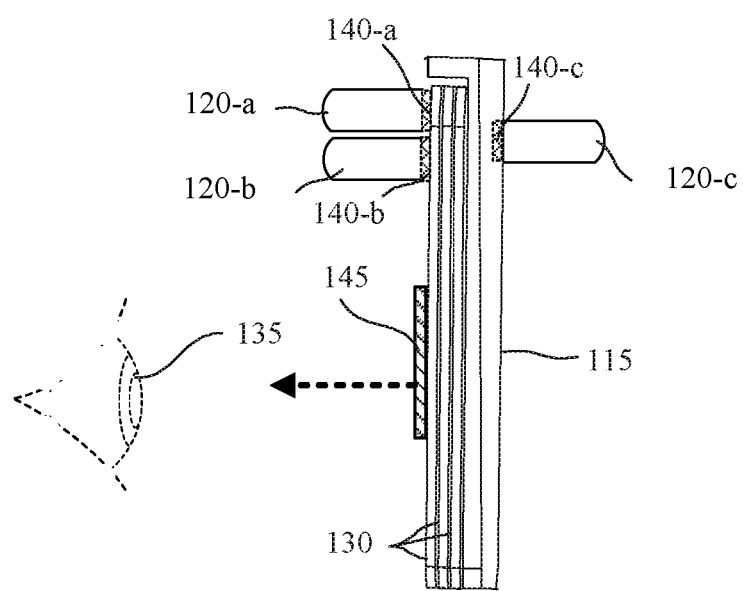

Turning first to FIGS. 1A-1C, an example display device 100 may implement display techniques in accordance with an present disclosure. In some examples, as illustrated, the display device 100 may be a head mounted device (HMD). However, for purposes of this disclosure, it should be appreciated that the techniques described herein are not limited only to HMD, but may also be implemented in other display devices, including, but not limited to, mobile phones, laptops, televisions, etc. For purposes of this disclosure, features of FIGS. 1A-1C may be discussed contemporaneously.

A display device 100 may be configured to provide virtual reality images (e.g., from at least one virtual environment input), and/or mixed reality (MR) images or augmented reality (AR) images (e.g., from at least one virtual environment input and one real environment input). The display device 100, when implemented as a HMD, may comprises a headpiece arranged to be worn on the user's head using a frame 105 (in the manner of conventional spectacles), helmet or other fit system. The purpose of the fit system is to support the display and provide stability to the display and other head borne systems such as tracking systems and cameras.

The display device 100 may include one or more optical components 115 (e.g., one or more lenses), including one or more optical waveguides 130 (see FIGS. 1B and 1C) that may allow the HMD to project images generated by one or more MicroLED projectors 120. The one or more MicroLED projectors 120 may project images to be displayed on the optical components 115. In accordance with aspects of the present disclosure, the optical component 115 may include three monolithic MicroLED projectors 120 (e.g., a first monolithic MicroLED projector 120-*a*, a second monolithic MicroLED projector 120-*b*, and a third monolithic MicroLED projector 120-*c*—See FIGS. 1B and 1C) that each generate a different monochrome color version of the same image. For purposes of this disclosure, the phrase "monochrome color version of an image" may refer to an image (e.g., photograph, video frame, picture, etc.) developed in varying tones of only one color. For example, a first projector 120-*a* may generate a first version of the image in a first color (e.g., red), a second projector 120-*b* may generate a second version of the image in a second color (e.g., blue), and a third projector may generate a third version of the image in a third color (e.g., green). In some examples, the MicroLED projectors 120 may be positioned either at the temple portion of the HMD or near the nasal cavity. Thus, in some aspects, two MicroLED projectors 120 may be positioned near the temple portion of the HMD device (e.g., the side of the head between the forehead and the ear—see dashed MicroLED projector 120-N) and one MicroLED projector 120 at the nasal side of the HMD (e.g., at the nose bridge portion when the HMD is worn by the user). Alternatively, in some aspects, two MicroLED projectors 120 may be positioned near the nasal side of the HMD, while the third MicroLED projector 120 may be positioned at the temple portion of the HMD. In each instance, the MicroLED projectors 120 may project the respective monochrome color versions of an image into one or more waveguides of the HMD. It should be further appreciated that, in such configuration, the plurality of MicroLED projectors 120 may be included on either the same side of the waveguide (see e.g., FIG. 1B) or on opposite sides of the waveguide (see e.g., FIG. 1C)

As illustrated in FIGS. 1B and 1C, the three MicroLED projectors 120 may be either positioned together on one side, or in different groups on opposing sides, of the optical waveguide 130 to the extent that the projectors 120 may be physically aligned with the input regions 140 of the optical waveguide 130. In some examples, the first MicroLED projector 120-*a* may generate the first version of the image in only red color tone, while the second MicroLED projector 120-*b* may generate the second version of the image in only blue color tone, and the third MicroLED projector 120-*c* may generate the third version of the image in only green color tone, such that the images can be combined to form a gamut of colors.

The optical components 115 may focus a user's vision on one or more portions of one or more display panels 125, as shown in FIG. 1B. The display panels 125 may display one or more images (e.g., left eye image and right eye image) based on signals received from the plurality of monolithic MicroLED projectors 120. The optics 115 may include left eye optics 115-L for focusing the user's left eye on the left eye image and right eye optics 115-R for focusing the user's right eye on the right eye image. For example, the optics 115 may focus the user's eyes on a central portion of each of the left eye image and the right eye image. The user's brain may combine the images viewed by each eye to create the perception that the user is viewing a combined image.

In some examples, the optical components 115 may include a left and right optical components (e.g., left optical component 115-L and right optical component 115-R). The optical components 115 may use plate-shaped (usually planar) waveguides 130 for transmitting angular image information to users' eyes as virtual images from image sources (e.g., light engine and/or MicroLED projectors 120) located out of the user's line of sight 135. The image information may be input near one end of the waveguides 130 and is output near another end of the waveguides 130.

In some examples, the image information may propagate along the optical waveguides 130 as a plurality of angularly related beams that are internally reflected along the waveguide. The optical waveguide 130 can be either a hollow pipe with reflective inner surfaces or an integrator rod with total or partial internal reflection. Additionally or alternatively, the optical waveguide 130 may be a single optical waveguide with different input regions for inputting different color lights from the three MicroLED projectors 120 or multiple optical waveguides or plates stacked on top of each other such that each optical waveguide may input a single color light (e.g., first optical waveguide for accepting red color light from a first MicroLED projector, a second optical waveguide for accepting a blue color light from a second MicroLED projector, and a third optical waveguide for accepting a green color light from the third MicroLED projector). In either instance, the optical waveguide 130 may include an inside surface (facing the user's eye) and an outside surface (facing the ambient environment), with both the inside and outside surfaces being exposed to air or another lower refractive index medium. As such the optical waveguide 130 may be at least partially transparent so that the user can also view the ambient environment through the waveguide.

Diffractive optics may be used for injecting the image information into the waveguides through a first range of incidence angles that are internally reflected by the waveguides as well as for ejecting the image information through a corresponding range of lower incidence angles for relaying or otherwise forming an exit pupil behind the waveguides 130 in a position that can be aligned with the users' eyes 135. Both the waveguides 130 and the diffractive optics at the output end of the waveguides may be at least partially transparent so that the user can also view the ambient environment through the waveguides 130, such as when the image information is not being conveyed by the waveguides or when the image information does not fill the entire field of view.

As discussed above, in some examples, the optical waveguide 130 may be a single waveguide that may include plurality of input regions for receiving at least a portion of light corresponding to an image from the one or more monolithic MicroLED projectors 120. In such instances, the ability of a single optical waveguide 130 to accept input from three different color lights produced by three MicroLED projectors 120 (e.g., 120-a, 120-b, and 120-c) may reduce the number of physical plates that may be used, and thereby reduce the physical size of the display device. The plurality of input regions may include at least a first input region 140-a, a second input region 140-b, and a third input region 140-c. In some instances, the first input region 140-a of the optical waveguide 130 may be physically aligned with the first projector 120-a to receive light corresponding to the first version of the image, the second input region 140-b of the optical waveguide 130 may be physically aligned with the second projector 120-b to receive light corresponding to the second version of the image, and the third input region 140-c of the optical waveguide 130 may be physically aligned with the third projector 120-c to receive light corresponding to the third version of the image. Further, the optical waveguide 130 may include an output region 145 configured to guide light from each of the plurality of MicroLED projectors 120 toward a target to make a final image visible to user's eye 135, wherein the final image is a fully colored image that combines the different monochrome color versions of the image.

In some aspects, the first input region 140-a, the second input region 140-b, and the third input region 140-c may be configured to independently receive the first version of the image, the second version of the image, and the third version of the image, respectively, and the optical waveguide 130 may include a plurality of diffractive optical elements configured to combine the first version of the image, the second version of the image, and the third version of the image to form the final image. In other words, features of the present disclosure provide techniques for each of the plurality of monochrome images (e.g., red, blue, and green) to be combined within the single optical waveguide 130 without requiring separate hardware for the optical combiner, e.g., large prisms to combine three different images together and relay optics to prevent the divergence of the pixels when combining the colors.

In some aspects, each input region 140 of the optical waveguide 130 may include a different grating structure. For example, the first input region 140-a of the optical waveguide 130 may include a first grating structure configured to cause a first amount of phase change upon reflection of the light corresponding to the first version of the image, while the second input region 140-b of the optical waveguide 130 may include a second grating structure configured to cause a second amount of phase change upon reflection of the light corresponding to the second version of the image. Even further, in such instance, the third input region 140-c of the optical waveguide 130 may include a third grating structure configured to cause a third amount of phase change upon reflection of the light corresponding to the version of the image, wherein the first amount, the second amount, and the third amount are different amounts.

Figure 3:
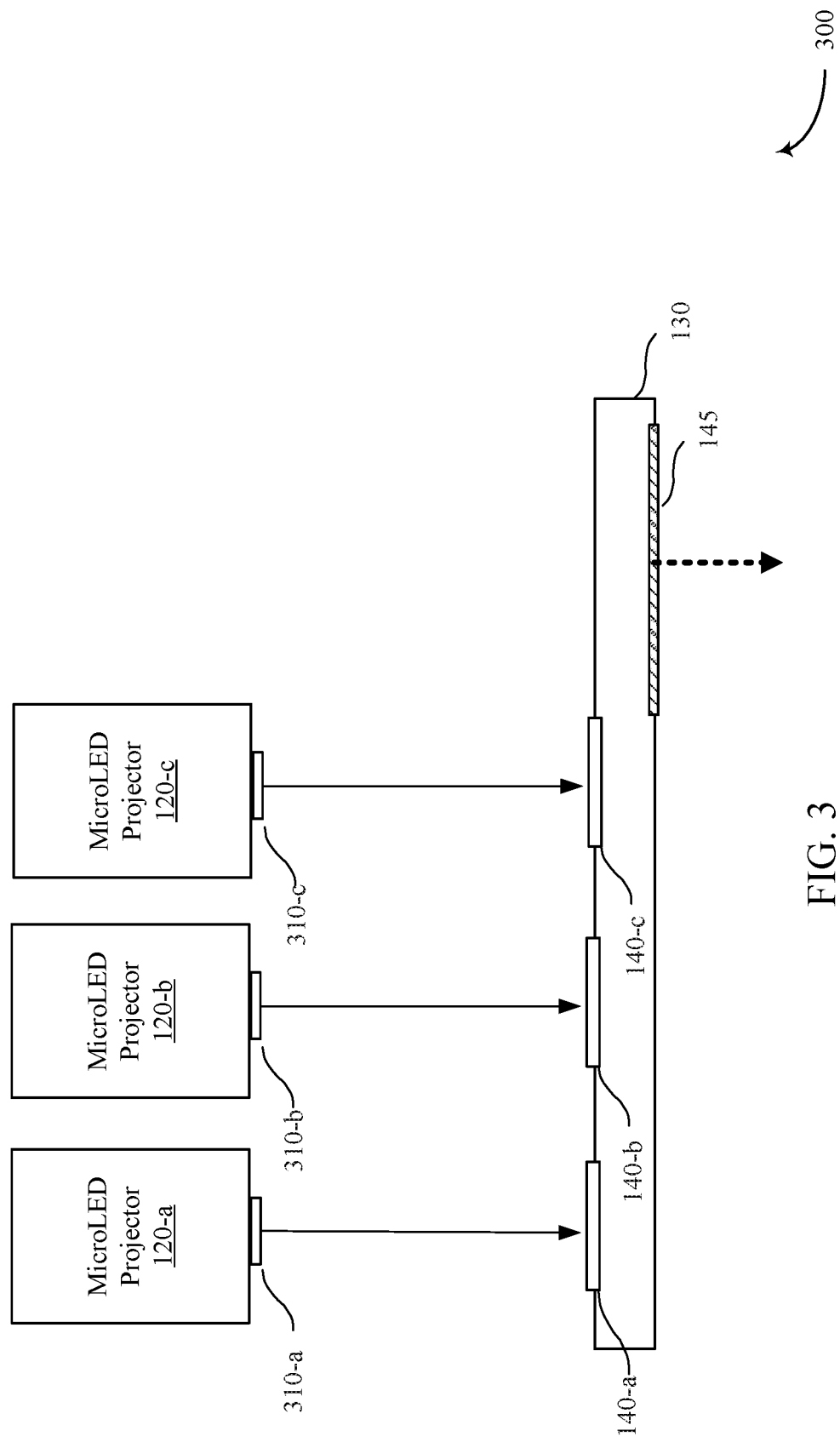
FIG. 3 is an example MicroLED display system that incorporate a plurality of monochrome MicroLED projectors to generate three monochrome images that are separately input into a single waveguide of the HMD in accordance with an implementation of the present disclosure.

By configuring each input region 140 with a different grating structure to separately reflect the light by varying degree of phase change for each version of the image, the aspects of the present disclosure may allow for the three monochrome images to overlap and align within the waveguide to produce a final image that is a fully colored image. Specifically, in some instances, the first grating structure, the second grating structure, and the third grating structure may be arranged such that the light associated with each of the first version of the image, the second version of the image, and the third version of the image overlaps within the optical waveguide to produce the final image. Thus, in such instances, as illustrated in FIG. 1B and FIG. 3 (infra), the three MicroLED projectors 120 may be mounted on the same side of the optical waveguide 130 (either on the inside surface or the outside surface), each MicroLED projector 120 being physically aligned with a different input region 140 to receive light from the MicroLED projectors 120.

Alternatively, in other examples—as illustrated in FIG. 1C—at least two of the three MicroLED projectors 120 may share the same input region 140 having a single grating structure to reduce the complexity of the optical waveguide 130. For example, different monochrome light having similar wavelengths, e.g., red and blue colors, may utilize the same waveguide parameters (e.g., grating), where such collaboration may allow the display device 100 to use the same grating regions for two projectors (e.g., first MicroLED projector 120-a and second MicroLED projector 120-b). In such instance, the first input region 140-a and the second input region 140-b of the optical waveguide may have a first grating structure which causes light to change phase upon reflection by a first amount, while the third input region 140-c of the optical waveguide 130 may have a second grating structure which causes light to change phase upon reflection by a second amount.

Continuing with discussion with reference to FIG. 1C, in instances that multiple MicroLED projectors 120 share the same grating structure of the optical waveguide 130, it may be difficult to manage spatial constraints of having all three input regions 140 on the same architecture. In such instances, the two MicroLED projectors (e.g., first MicroLED projector 120-a and second MicroLED projector 120-b) that share the same grating architecture may be positioned on a first side of the optical waveguide 130, whereas the third MicroLED projector 120-c may be physically positioned on a second side of the optical waveguide 130. Specifically, the first projector 120-a and the second projector 120-b may be physically positioned at a first side of the optical waveguide 130 such that the light from the first projector 120-a and the second projector 120-b is projected towards the first input grating structure, and the third projector 120-c may be physically positioned at a second side of the optical waveguide such that the light from the third projector 120-c may be projected towards the second grating structure of the optical waveguide, wherein the second side is opposite the first side, as illustrated in FIG. 1C. In some examples, the third input region 140-c may overlap with at least one of the first input region 140-a or the second input region 140-b. It should be also appreciated that although FIG. 1C illustrates the first MicroLED projector 120-a and second MicroLED projector 120-b on the inside of the optical waveguide 130 (e.g., towards the position of the eye 135) and the third MicroLED projector 120-c on the outside of the optical waveguide 130, it is possible to have the positioning reversed such that first MicroLED projector 120-*a* and second MicroLED projector 120-*b* may be positioned on the outside of the optical waveguide 130, and the third MicroLED projector 120-*c* on the inside of the optical waveguide 130.

Figure 7:
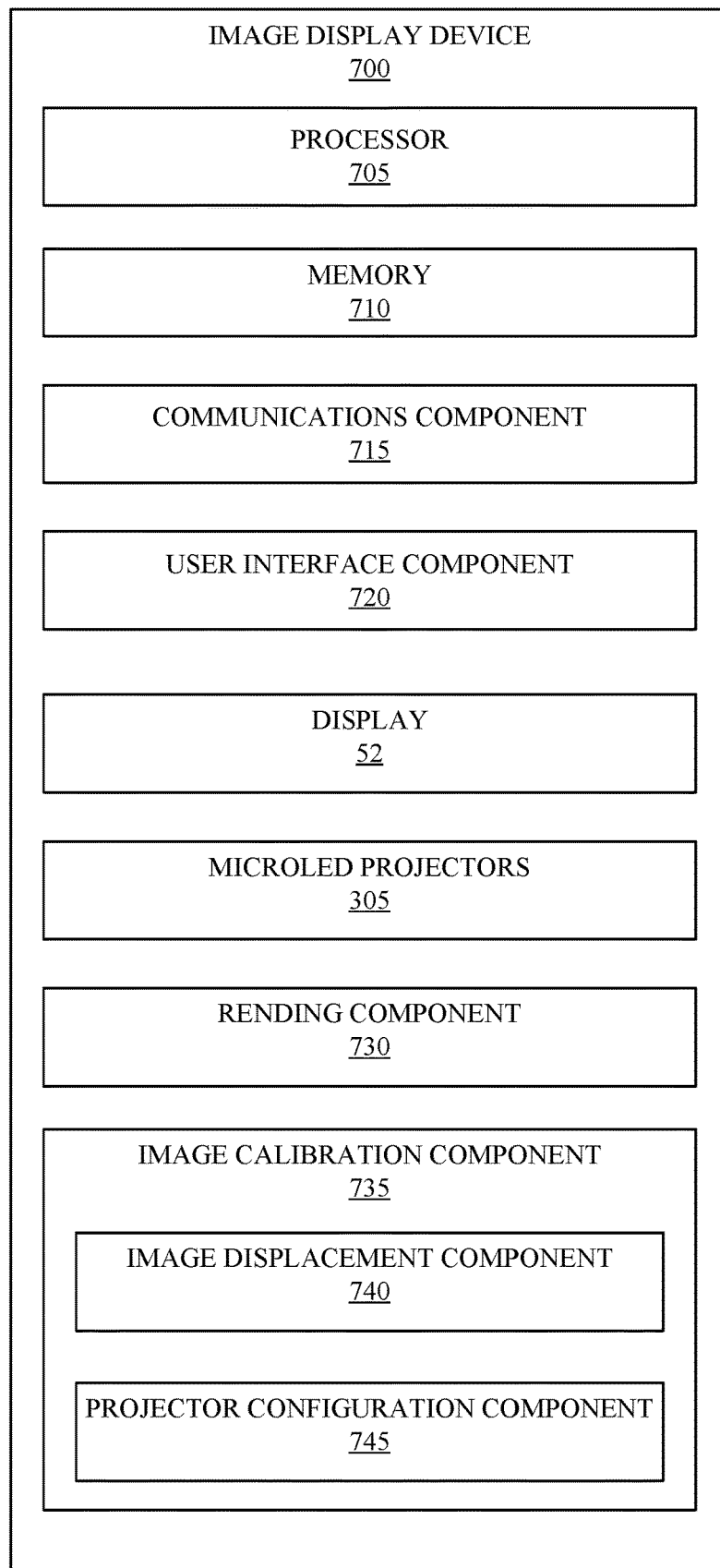
FIG. 7 is a schematic block diagram of an example device in accordance with an implementation of the present disclosure.

Though not shown in FIGS. 1A-1C, a processing apparatus 705, memory 710 and other components may be integrated into the display device 100 (see FIG. 7). Alternatively, such components may be housed in a separate housing connected to the display device 100 by wired and/or wireless means. For example, the components may be housed in a separate computer device (e.g., smartphone, tablet, laptop or desktop computer etc.) which communicates with the display device 100. Accordingly, mounted to or inside the display device may be an image source, such as a plurality of MicroLED projectors for projecting a virtual image onto the optical component 115.

Figure 2:
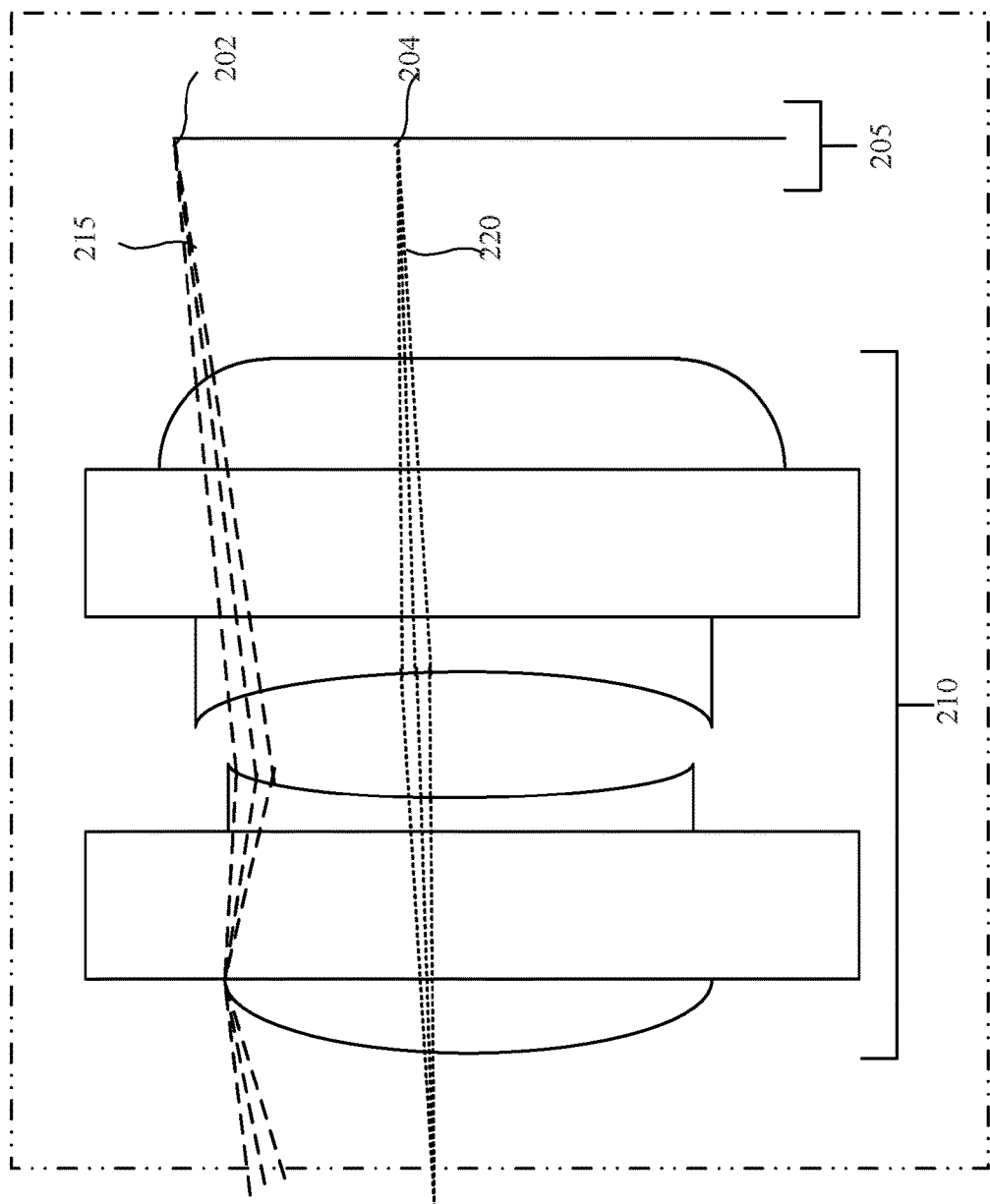
FIG. 2 is an example of light projection from a MicroLED projector to an optical waveguide in accordance with an implementation of the present disclosure.
Figure 2:
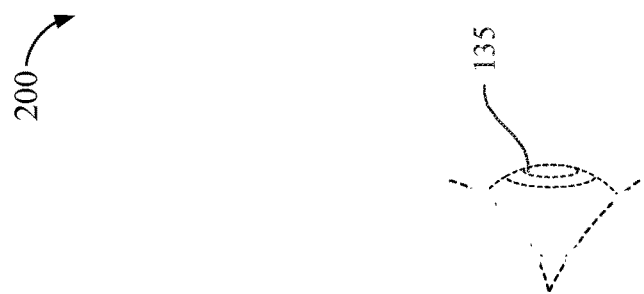

Referring next to FIG. 2, an imaging unit 200 may map light corresponding each pixel (e.g., pixels 202, 204) of an image from space to angular reflecting input into an optical waveguide. In some aspects, the imaging unit 200 may be an example of a MicroLED projector 120 described with reference to FIG. 1. Although, aspects of FIG. 2 describe image projectors from a single projector, it should be appreciated that the same may be replicated for additional MicroLED projectors described herein.

As illustrated, the image to be projected may be represented in angular space where every angle reflects light at the input location of first pixel 202 and second pixel 204. The imaging unit 200 (or MicroLED projector 120) may include a display panel 205 that may display the image to be projected within the optical waveguide 130. Each dashed line in FIG. 2 may represent light rays coming from a different position on the panel (e.g., from first pixel 202 at the border of the image and a second pixel 204 from the middle region of the image). In order to ensure that the user views the entire image, the imaging unit 200 may manipulate one or more light rays through the optics 210 at various angles such that the user views the entire image within the HMD system regardless of where the eye of the user is looking within the HMD. Thus, as illustrated, in some aspects the boundary pixels may be managed with more extensive manipulation of angle reflections through the optics 210 than the pixels in the middle of the image (e.g., second pixel 204).

In this respect, the optical waveguide may reflect light associated with each pixel (e.g., first light rays 215 associated with the first pixel 205, and second light rays 220 associated with the second pixel 210) such that the image may be displayed to the user based on the where the eye would be at the output region of the optical waveguide.

Turning next to FIG. 3, an example MicroLED display system 300 incorporate a plurality of monochrome MicroLED projectors 120 to generate three monochrome versions of the same image (e.g., one in red, one in blue, one in green) that are separately input into a single waveguide 130 of the HMD in accordance with an implementation of the present disclosure. As discussed above, the optical waveguide 130 may include a plurality of input regions 140 (also referred to as in-coupling elements) located in the region of the waveguide 130 to accept input of light from the plurality of MicroLED projectors 120 (e.g., at the user's nose bridge or temple when the HMD device is worn by the user). The input regions 140 may be formed from, for example, a surface diffraction grating, volume diffraction grating, or a refractive component. The waveguide 130 may further include a single output region 145 (also called out-coupling element) and a transmission channel.

In some aspects, the output port 310 of each MicroLED projector 120 may be optically coupled (but not necessarily physically coupled) to each of the plurality of input regions 140 of the optical waveguide 130. For example, the first input region 140-*a* of the optical waveguide 130 may be physically aligned and optically coupled (but not physically coupled) with the first MicroLED projector 120-*a* to receive light corresponding to the first version of the image output from the first output port 310-*a* of the first MicroLED projector 120-*a*. Similarly, the second input region 140-*b* of the optical waveguide 130 may be physically aligned and optically coupled with the second MicroLED projector 120-*b* to receive light corresponding to the second version of the image output from the second output port 310-*b* of the second MicroLED projector 120-*b*. Finally, the third input region 140-*c* of the optical waveguide 130 may be physically aligned and optically coupled with the third MicroLED projector 120-*c* to receive light corresponding to the third version of the image output from the third output port 310-*c* of the third MicroLED projector 120-*c*.

The optical waveguide 130 may further include an output region 145 configured to guide light from each of the plurality of MicroLED projectors 120 toward a target (e.g., a user's eye) to make a final image visible to user, wherein the final image is a fully colored image that combines the different monochrome color versions of the image. In some instances, each of the plurality of input regions 140 may independently receive each of the three versions of the monochrome images from the plurality of MicroLED projectors 120 such that the optical waveguide 140 may combine the first version of the image, the second version of the image, and the third version of the image to form the final image by ensuring that the light from each of the different versions of the image overlap.

The optical waveguide 130 may achieve the overlapping image by combination of different grating structures for different input regions, and by nature of the replication process that allow the images to stack up on top of each other upon entering the optical waveguide 130. As discussed above, in some instances, minor calibration corrections may be required to be performed in order to ensure that the three different versions of the image overlap to form a high resolution image to be output from the output region 145.

For the calibration process, features of the present disclosure may utilize a camera in position of an eye to detect light rays output from an optical waveguide 130. The light rays may correspond to a plurality of monochrome color versions of an image generated by a plurality of monolithic MicroLED projectors. Upon detecting the light rays output from the output region 145, the image calibration component 735 (see FIG. 7) of the present disclosure may determine a first position of a first version of the image and determine a second position of a second version of the image from the plurality of monochrome color versions of the image. Based on identification of the position of each version of the image, the image calibration component 735 may measure an image displacement between the first position of the first version of the image and the second position of the second version of the image to calculate an offset value between the first position and the second position. In some examples, the image displacement is one or both of lateral displacement or angular rotational displacement. Thus, based on the measurement, the image calibration component 735 of the present disclosure may configure the display device to adjust at least one image output parameter of the plurality of MicroLED projectors 120 such that the output from the optical waveguide of the plurality of monochrome color versions of the image have an overlapping alignment that meets an alignment threshold.

For example, if the image calibration component 735 detects a pixel displacement of 20 microns between the first version of the image (e.g., the version produced by green MicroLED projector) and a second version of the image (e.g., the version produced by the blue MicroLED projector), the camera may be configured to detect such displacement and configure one of the MicroLED projectors 120 (e.g., the green MicroLED projector) to offset the green images by 5 pixels. Thus, instead of starting the green image at pixel position 0, the calibration process may offset the green image to pixel 5 position such that the green image and the blue image align or overlap when output from the optical waveguide 130.

Additionally, in some examples, each input region 140 of the optical waveguide 130 may have a different grating structure to cause different variation of phase change upon reflection of light that is input into the optical waveguide 130. For example, in some instances, the first input region 140-a of the optical waveguide 130 may include a first grating structure configured to cause a first amount of phase change upon reflection of the light corresponding to the first version of the image, the second input region 140-b of the optical waveguide 130 may include a second grating structure configured to cause a second amount of phase change upon reflection of the light corresponding to the second version of the image, and the third input region 140-c of the optical waveguide 130 may include a third grating structure configured to cause a third amount of phase change upon reflection of the light corresponding to the version of the image. In some aspects, of the first amount, the second amount, and the third amount may be different amounts that result in all three versions of the image to overlap within the optical guide 130.

Figure 4:
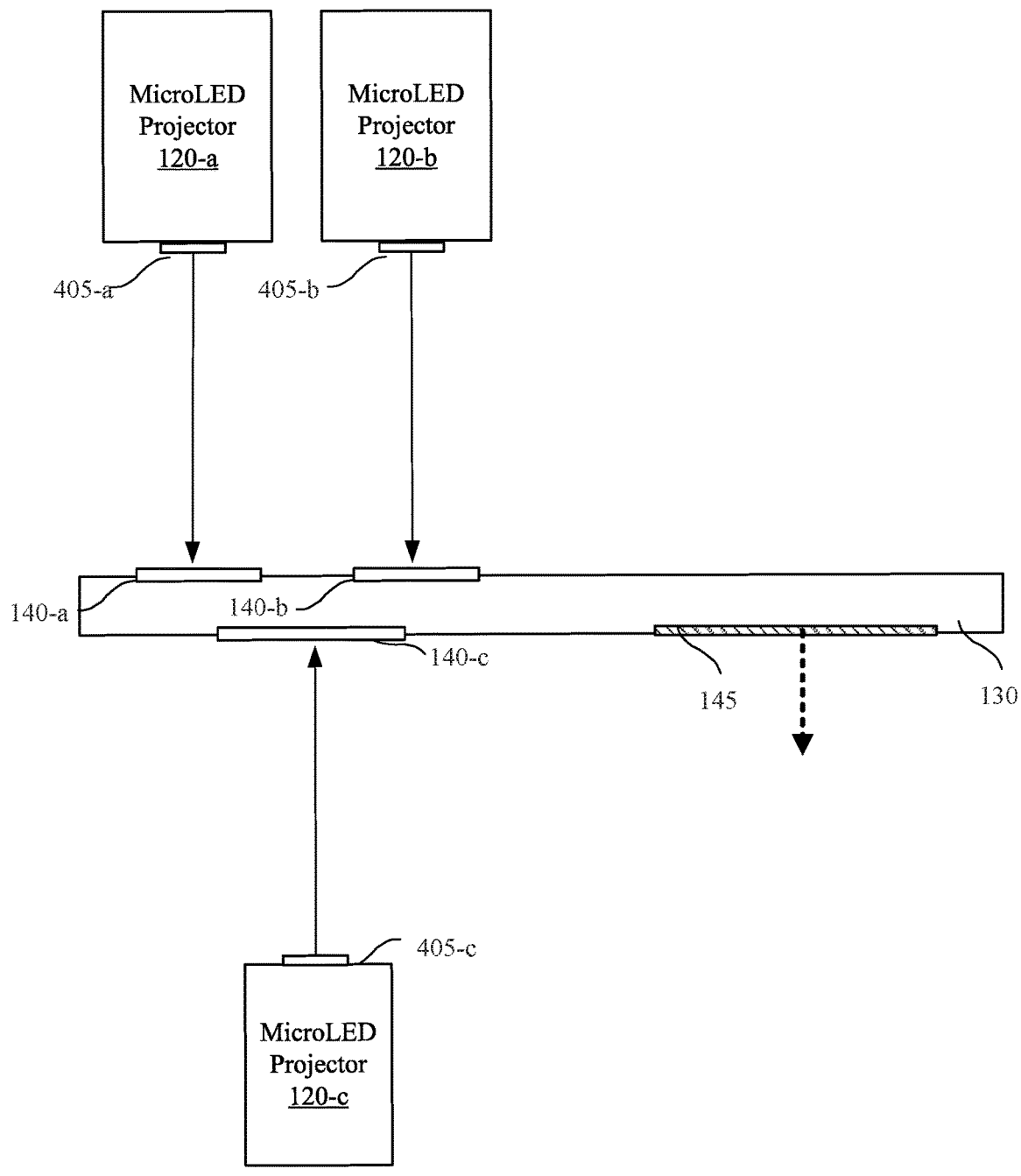
FIG. 4 is another example MicroLED display system that incorporate a plurality of monochrome MicroLED projectors to generate three monochrome images that are separately input into a single waveguide of the HMD while allowing at least two of the MicroLED projectors to share the same grating structure in accordance with an implementation of the present disclosure.

In other instances, such as in FIG. 4, a MicroLED display system 400 may incorporate a plurality of monochrome MicroLED projectors 120 to generate three monochrome images that are separately input into a single waveguide 130 of the HMD, but allowing for at least two of the MicroLED projectors (e.g., first MicroLED projector 120-a and second MicroLED projector 120-b) to share the same grating structure in accordance with an implementation of the present disclosure. In such instance, the first input region 140-a and the second input region 140-b of the optical waveguide 130 may have a first grating structure (e.g., similar grating parameters) which causes light to change phase upon reflection by a first amount, and the third input region 140-c of the optical waveguide 130 may have a second grating structure which causes light to change phase upon reflection by a second amount. In such instance, the first projector 120-a and the second projector 120-b may be physically positioned at a first side of the optical waveguide 130 such that the light from the first projector 120-a and the second projector 120-b is projected towards the first input grating structure. In same architecture, the third projector 120-c may be physically positioned at a second side of the optical waveguide 130 such that the light from the third projector 120-c may be projected towards the second grating structure of the optical waveguide. In some examples, as illustrated in FIG. 4, the second side of the optical waveguide 130 may be opposite to the first side.

In such instances, there may be a number of reasons that the projectors 120 may be positioned on the opposite sides of the waveguide 130. First, in general, the lateral dimensions of the projector 120 may be larger than the output stream. Thus, in order to handle the spatial constraints of mounting the projectors within the display device, it may be necessary to physically separate the projectors 120 to different portions of the optical waveguide. However, it should be appreciated that such separation may not only be limited to positioning the projectors 120 on opposite sides, but may also be on the same side but different ends of the optical waveguide 130. Second, the projectors may be spatially separated in order to allow multiple colors (e.g., blue and red) to work with the same waveguide parameters (e.g., to be projected onto the same grating regions). Thus, in such instance, the first projector 120-a and the second projector 120-b may be physically aligned with the first input region 140-a and second input region 140-b that both share the same grating structure. Meanwhile, the third projector 120-c may be physically aligned with the third input region 140-c that is spatially separated from the first and second input regions (140-a and 140-b). Third, by placing two projectors on one side and the remaining projector on the other side of the waveguide, the opposing input regions may overlap, thereby reducing the area taken up by the input regions and/or the space taken up by the projectors. Such architecture allows the display device 100 to achieve smaller form factor and simpler hardware configuration.

Figure 5:
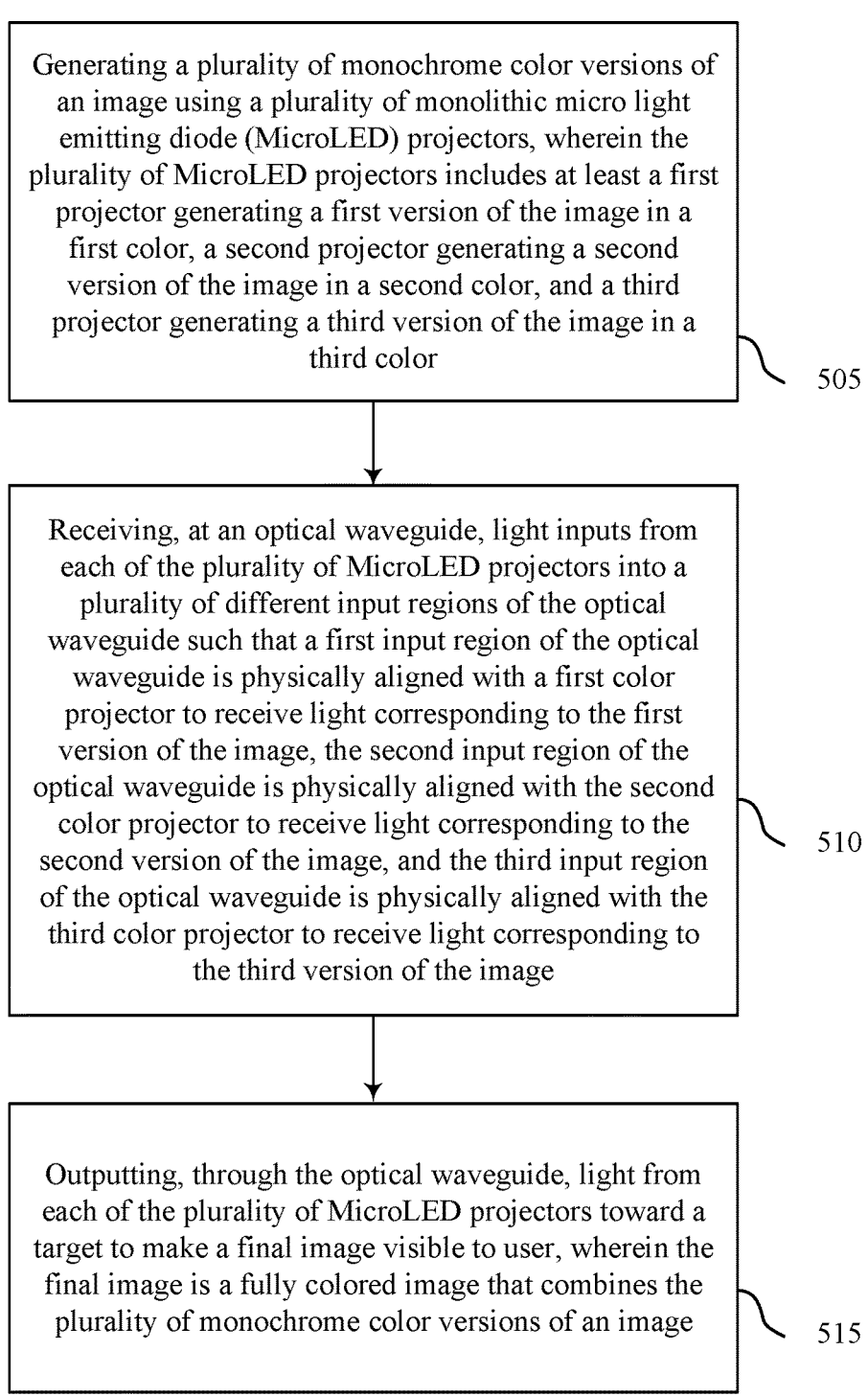
FIG. 5 is a flow chart of a method for displaying images on a display device in accordance with an implementation of the present disclosure.

Referring next to FIG. 5, method 500 for displaying an image on a display device is described. In some examples, the display device may be a HMD 105. However, it should also be appreciated that the features of the method 500 may be incorporated not only in the HMD 105 technology, but also other display devices such as mobile phones, tablets, or laptops. Although the method 500 is described below with respect to the elements of the display device, other components may be used to implement one or more of the steps described herein.

At block 505, the method 500 may include generating a plurality of monochrome color versions of an image using a plurality of monolithic MicroLED projectors. In some examples, the plurality of MicroLED projectors may include at least a first projector generating a first version of the image in a first color, a second projector generating a second version of the image in a second color, and a third projector generating a third version of the image in a third color. In some examples, the first projector may generate the first version of the image in only red color tone, the second projector may generate the second version of the image in only blue color tone, and the third projector may generate the third version of the image in only green color tone. Aspects of block 505 may be performed by a plurality of MicroLED projectors 305-a, 305-b, and 305-c in conjunction with rendering component 730 described with reference to FIGS. 3 and 7.

At block 510, the method 500 may include receiving, at an optical waveguide, light inputs from each of the plurality of MicroLED projectors into a plurality of different input regions of the optical waveguide such that a first input region of the optical waveguide is physically aligned with a first color projector to receive light corresponding to the first version of the image, the second input region of the optical waveguide is physically aligned with the second color projector to receive light corresponding to the second version of the image, and the third input region of the optical waveguide is physically aligned with the third color projector to receive light corresponding to the third version of the image. In some examples, the optical waveguide may have a plurality of internally reflective surfaces to enable light rays of a plurality of different colors generated by the plurality of MicroLED projectors to propagate through its substrate by total internal reflection.

Further, in some examples, the first input region, the second input region, and the third input region may be configured to independently receive the first version of the image, the second version of the image, and the third version of the image, respectively. Further, in such situation, the optical waveguide may include a plurality of diffractive optical elements configured to combine the first version of the image, the second version of the image, and the third version of the image to form the final image.

For example, the first input region of the optical waveguide may include a first grating structure configured to cause a first amount of phase change upon reflection of the light corresponding to the first version of the image. Further, in some examples, the second input region of the optical waveguide may include a second grating structure configured to cause a second amount of phase change upon reflection of the light corresponding to the second version of the image, and the third input region of the optical waveguide may include a third grating structure configured to cause a third amount of phase change upon reflection of the light corresponding to the version of the image, wherein the first amount, the second amount, and the third amount are different amounts. In such instances, the first grating structure, the second grating structure, and the third grating structure may be arranged such that the light associated with each of the first version of the image, the second version of the image, and the third version of the image overlaps within the optical waveguide to produce the final image In other instances, the first input region and the second input region of the optical waveguide may have a first grating structure which causes light to change phase upon reflection by a first amount, and the third input region of the optical waveguide may have a second grating structure which causes light to change phase upon reflection by a second amount. In other words, in some examples, two colors (e.g., light associated with the first color and the second color image, where the first color is red and second color is blue) may share the same waveguide parameters (e.g., grating structure). In such situations, features of the present disclosure may allow use of a single grating regions for two projectors (e.g., projectors generating the red color monochrome image and the blue color monochrome image) and a separate waveguide parameter for the third projector (e.g., projector generating the green color monochrome image).

By sharing the waveguide parameters for at least two projectors, features of the present disclosure may further reduce the size of the HMD. In order to ensure such implementation, aspects of the present disclosure may configure the first projector and the second projector to be physically positioned at a first side of the optical waveguide such that the light from the first projector and the second projector is projected towards the first input grating structure, and the third projector may be physically positioned at a second side of the optical waveguide such that the light from the third projector is projected towards the second grating structure of the optical waveguide, wherein the second side is opposite the first side. In some examples, the third input region may overlap with at least one of the first input region or the second input region. Aspects of block 510 may be performed by the display such as an optical waveguide 52 described with references to FIGS. 1-3 and 7.

At block 515, the method 500 may include outputting, through the optical waveguide, light from each of the plurality of MicroLED projectors toward a target to make a final image visible to user, wherein the final image is a fully colored image that combines the plurality of monochrome color versions of an image. Aspects of the 515 may also be performed by the display such an optical waveguide 52 that may include an output region for allowing light to exit to user's eye displaying the rendered image.

Figure 6:
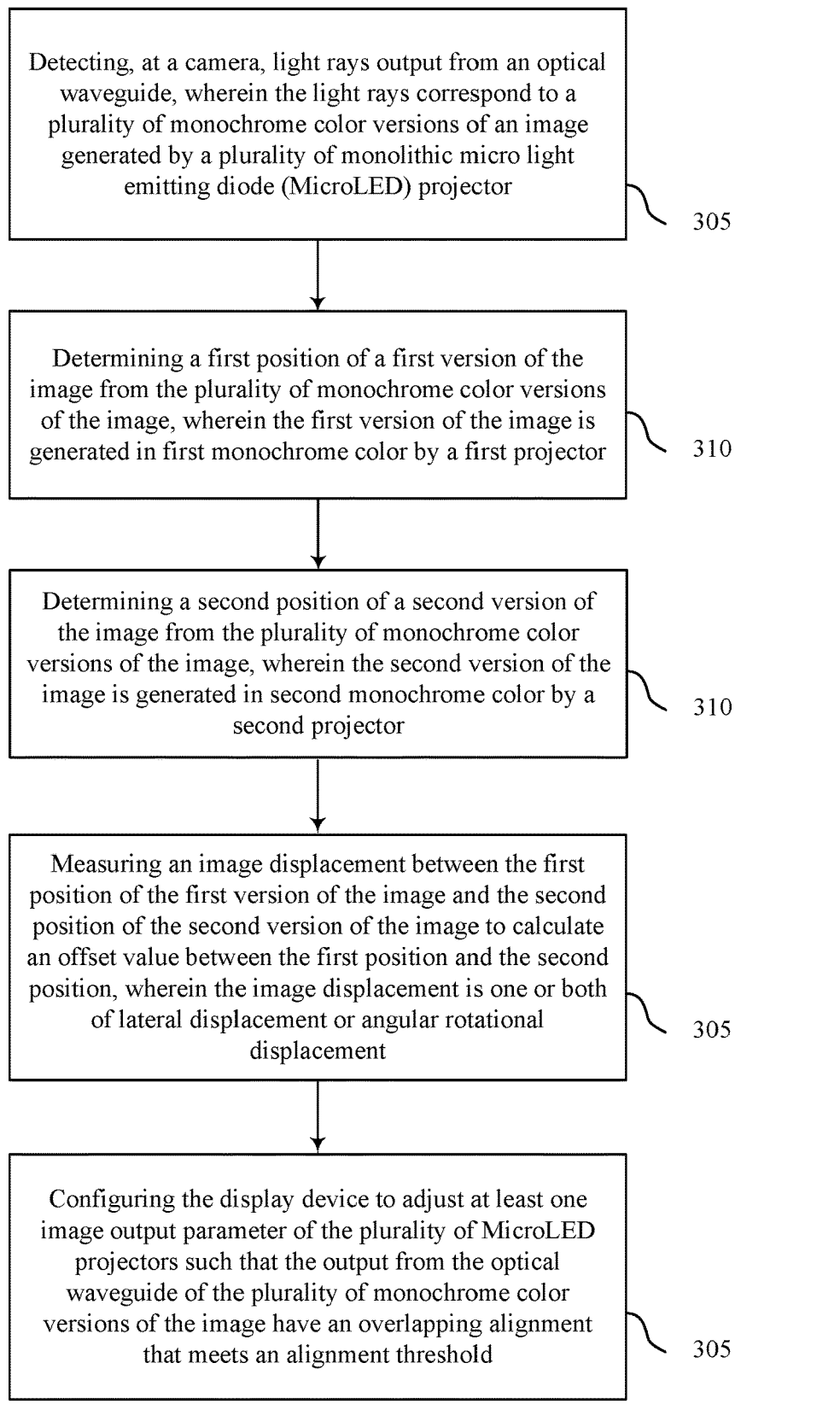
FIG. 6 is a flow chart of a method for calibrating images on a display device in accordance with an implementation of the present disclosure.

Turning next to FIG. 6, method 600 for calibrating an image on a display device is described. As discussed above, the features of the method 600 may be incorporated not only in the HMD 105 technology, but also other display devices such as mobile phones, tablets, or laptops. Although the method 600 is described below with respect to the elements of the display device, other components may be used to implement one or more of the steps described herein.

At block 605, the method 600 may include detecting, at a camera, light rays output from an optical waveguide, wherein the light rays correspond to a plurality of monochrome color versions of an image generated by a plurality of monolithic MicroLED projectors. In some examples, the plurality of MicroLED projectors may include at least the first projector for generating images in the first monochrome color, the second projector for generating images in the second monochrome color, and a third projector for generating images in a third monochrome color. Aspects of block 605 may be performed by the user interface component 720 described with reference to FIG. 7. In some examples, the user interface 720 may include a camera for detecting light output from the optical waveguide. It should also be appreciated that, in some examples, a camera may be a separate hardware removed from the image display device.

At block 610, the method 600 may include determining a first position of a first version of the image from the plurality of monochrome color versions of the image, wherein the first version of the image is generated in first monochrome color by a first projector. In some examples, the optical waveguide receives the first version of the image at a first input region of the optical waveguide. The first input region of the optical waveguide may be physically aligned with the first projector. Aspects of block 610 may be performed by the image calibration component 735 described with reference to FIG. 7.

At block 615, the method 600 may include determining a second position of a second version of the image from the plurality of monochrome color versions of the image, wherein the second version of the image is generated in second monochrome color by a second projector. In some examples, the optical waveguide may receive the second version of the image at a second input region of the optical waveguide. The second input region of the optical waveguide may be physically aligned with the second projector. In some instances, the first input region and the second input region are configured to independently receive the first version of the image and the second version of the image, respectively, and wherein the optical waveguide may further include a plurality of diffractive optical elements configured to combine the first version of the image and the second version of the image to form a final image. In other words, features of the present disclosure allow the three monochrome images to be merged into a single image within the single waveguide without requiring prisms and other hardware to combine the three separate images prior to inputting the light into the optical waveguide. Aspects of block 610 may be performed by the image calibration component 735 described with reference to FIG. 7.

At block 620, the method 600 may include measuring an image displacement between the first position of the first version of the image and the second position of the second version of the image to calculate an offset value between the first position and the second position, wherein the image displacement is one or both of lateral displacement or angular rotational displacement. Aspects of block 620 may be performed by the image displacement component 740 described with reference to FIG. 7.

At block 625, the method 600 may include configuring the display device to adjust at least one image output parameter of the plurality of MicroLED projectors such that the output from the optical waveguide of the plurality of monochrome color versions of the image have an overlapping alignment that meets an alignment threshold. In some examples, configuring the display device may adjust at least one image output parameter includes correcting pixel spacing between the first position of the first version of the image and the second position of the second version of the image by shifting a start position of at least one of the first version of the image or the second version of the image.

In some examples, configuring the display device may further include adjusting a color resolution of the plurality of MicroLED projectors, including lowering the color resolution of the first monochrome color generated by the first projector and/or the second monochrome color generated by the second projector, while increasing the color resolution of the third monochrome color generated by the third projector. For example, in instances the first monochrome color may be red color tone of the image, the second monochrome color may be blue color tone of the image, and the third monochrome color is green color tone of the image, the display device may be able to lower the resolution for blue and/or red, and increase the resolution for the green color. Because the human eye has the highest sensitivity for green light, the display device may be able to display a high resolution image by compensating the lower blue and/or red resolution with an image processing with the higher green resolution. Due to lower blue and/or red resolutions, the form factor of the blue and/or red imaging system may be significantly reduced (e.g., reduction of factor of four in some instances). Thus, the smaller form factor for two of the three projectors may allow the HMD to have a smaller size and form factor. Aspects of block 625 may be performed by the projector configuration component 745 described with reference to FIG. 7. Additionally, as discussed above, although the example herein discusses lowering the color resolution of blue and/or red color images, it should be appreciated that the modification of the color resolution is not limited to only blue and/or red colors, but instead may be adapted for any color. Additionally, in some examples, the techniques of the present disclosure may be applied to lowering the color resolution of only one color as opposed to two colors.

Referring now to FIG. 7, a diagram illustrating an example of a hardware implementation for displaying an image frame on a display device (e.g., HMD) in accordance with various aspects of the present disclosure is described. In some examples, the image display device 400 may be an example of the HMD 105 described with reference to FIGS. 1A and 1B.

The image display device 400 may include a processor 405 for carrying out one or more processing functions (e.g., methods 500 and 600) described herein. The processor 705 may include a single or multiple set of processors or multi-core processors. Moreover, the processor 705 can be implemented as an integrated processing system and/or a distributed processing system.

The image display device 700 may further include memory 710, such as for storing local versions of applications being executed by the processor 705. In some aspects, the memory 710 may be implemented as a single memory or partitioned memory. In some examples, the operations of the memory 710 may be managed by the processor 705. Memory 710 can include a type of memory usable by a computer, such as random access memory (RAM), read only memory (ROM), tapes, magnetic discs, optical discs, volatile memory, non-volatile memory, and any combination thereof. Additionally, the processor 705, and memory 710 may include and execute operating system (not shown).

Further, the image display device 700 may include a communications component 715 that provides for establishing and maintaining communications with one or more parties utilizing hardware, software, and services as described herein. Communications component 715 may carry communications between components on image display device 705. The communications component 715 may also facilitate communications with external devices to the image display device 700, such as to electronic devices coupled locally to the image display device 700 and/or located across a communications network and/or devices serially or locally connected to image display device 700. For example, communications component 715 may include one or more buses operable for interfacing with external devices. In some examples, communications component 715 establish real-time video communication events, via the network, with another user(s) of the communication system operating their own devices running their own version of the communication client software in order to facilitate augmented reality.

The image display device 700 may also include a user interface component 720 operable to receive inputs from a user of display device 700 and further operable to generate outputs for presentation to the user. User interface component 720 may include one or more input devices, including but not limited to a navigation key, a function key, a microphone, a voice recognition component, joystick or any other mechanism capable of receiving an input from a user, or any combination thereof. Further, user interface component 720 may include one or more output devices, including but not limited to a speaker, headphones, or any other mechanism capable of presenting an output to a user, or any combination thereof.

The image display device 700 may include a rendering component 730 that controls the light engine(s) to generate an image visible to the wearer of the HMD, i.e. to generate slightly different 2D or 3D images that are projected onto the waveguide so as to create the impression of 3D structure. In some examples, the rendering component 730 may be configured to generate a plurality of monochrome color versions of an image using a plurality of monolithic MicroLED projectors, wherein the plurality of MicroLED projectors includes at least a first projector generating a first version of the image in a first color, a second projector generating a second version of the image in a second color, and a third projector generating a third version of the image in a third color. The rendering component 730 may also input light, at an optical waveguide, inputs from each of the plurality of MicroLED projectors into a plurality of different input regions of the optical waveguide such that a first input region of the optical waveguide is physically aligned with a first color projector to receive light corresponding to the first version of the image, the second input region of the optical waveguide is physically aligned with the second color projector to receive light corresponding to the second version of the image, and the third input region of the optical waveguide is physically aligned with the third color projector to receive light corresponding to the third version of the image.

The image display device 700 may further include a display 52 that may be an example of the optics 115 or waveguide 210 described with reference to FIGS. 1A, 1B and 2. In some examples, the display 52 may be configured to output, through the optical waveguide, light from each of the plurality of MicroLED projectors toward a target to make a final image visible to user, wherein the final image is a fully colored image that combines the plurality of monochrome color versions of an image.

The image display device 700 may further an image calibration component 735. In some examples, the image calibration component 735 may be configured to detect, at a camera, light rays output from an optical waveguide, wherein the light rays correspond to a plurality of monochrome color versions of an image generated by a plurality of monolithic MicroLED projectors. The image calibration component 735 may further be configured to determine a first position of a first version of the image from the plurality of monochrome color versions of the image, wherein the first version of the image is generated in first monochrome color by a first projector. The image calibration component 735 may further be configured to determine a second position of a second version of the image from the plurality of monochrome color versions of the image, wherein the second version of the image is generated in second monochrome color by a second projector. The image calibration component 735, and more particularly, the image displacement component 740 may be configured to measure an image displacement between the first position of the first version of the image and the second position of the second version of the image to calculate an offset value between the first position and the second position, wherein the image displacement is one or both of lateral displacement or angular rotational displacement.

The image calibration component 735 may also include a projector configuration component 745 to configure the display device to adjust at least one image output parameter of the plurality of MicroLED projectors such that the output from the optical waveguide of the plurality of monochrome color versions of the image have an overlapping alignment that meets an alignment threshold. In some examples, configuring the display device may adjust at least one image output parameter including correcting pixel spacing between the first position of the first version of the image and the second position of the second version of the image by shifting a start position of at least one of the first version of the image or the second version of the image.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device, which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. In contract, a wired device may include a server operable in a data centers (e.g., cloud computing).

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. A method for calibrating an image on a display device, comprising:
    detecting, at a camera, light rays output from an optical waveguide, wherein the light rays correspond to a plurality of monochrome color versions of an image generated by a plurality of monolithic micro light emitting diode (MicroLED) projectors;
    determining a first position of a first version of the image from the plurality of monochrome color versions of the image, wherein the first version of the image is generated in first monochrome color by a first projector;
    determining a second position of a second version of the image from the plurality of monochrome color versions of the image, wherein the second version of the image is generated in second monochrome color by a second projector;
    measuring an image displacement between the first position of the first version of the image and the second position of the second version of the image to calculate an offset value between the first position and the second position, wherein the image displacement is one or both of lateral displacement or angular rotational displacement; and
    configuring the display device to adjust at least one image output parameter of the plurality of MicroLED projectors such that the output from the optical waveguide of the plurality of monochrome color versions of the image have an overlapping alignment that meets an alignment threshold.

2. The method of claim 1, wherein configuring the display device to adjust at least one image output parameter includes correcting pixel spacing between the first position of the first version of the image and the second position of the second version of the image by shifting a start position of at least one of the first version of the image or the second version of the image.

3. The method of claim 1, wherein the plurality of MicroLED projectors include at least the first projector for generating images in the first monochrome color, the second projector for generating images in the second monochrome color, and a third projector for generating images in a third monochrome color.

4. The method of claim 3, further comprising:
    adjusting a color resolution of the plurality of MicroLED projectors, including lowering the color resolution of the first monochrome color generated by the first projector and the second monochrome color generated by the second projector, while increasing the color resolution of the third monochrome color generated by the third projector.

5. The method of claim 4, wherein the first monochrome color is red color tone of the image,
    wherein the second monochrome color is blue color tone of the image, and wherein the third monochrome color is green color tone of the image.

6. The method of claim 1, wherein the optical waveguide receives the first version of the image at a first input region of the optical waveguide, the first input region of the optical waveguide is physically aligned with the first projector, and
wherein the optical waveguide receives the second version of the image at a second input region of the optical waveguide, the second input region of the optical waveguide is physically aligned with the second projector.

7. The method of claim 6, wherein the first input region and the second input region are configured to independently receive the first version of the image and the second version of the image, respectively, and wherein the optical waveguide further includes a plurality of diffractive optical elements configured to combine the first version of the image and the second version of the image to form a final image.

8. The method of claim 1, wherein the display device is a head mounted display (HMD) device, and further comprising outputting the image toward a target.

9. An apparatus for calibrating an image on a display device, comprising:
a memory configured to store instructions;
a processor communicatively coupled with the memory, the processor configured to executed the instructions to:
detect, at a camera, light rays output from an optical waveguide, wherein the light rays correspond to a plurality of monochrome color versions of an image generated by a plurality of monolithic micro light emitting diode (MicroLED) projectors;
determine a first position of a first version of the image from the plurality of monochrome color versions of the image, wherein the first version of the image is generated in first monochrome color by a first projector;
determine a second position of a second version of the image from the plurality of monochrome color versions of the image, wherein the second version of the image is generated in second monochrome color by a second projector;
measure an image displacement between the first position of the first version of the image and the second position of the second version of the image to calculate an offset value between the first position and the second position, wherein the image displacement is one or both of lateral displacement or angular rotational displacement; and
configure the display device to adjust at least one image output parameter of the plurality of MicroLED projectors such that the output from the optical waveguide of the plurality of monochrome color versions of the image have an overlapping alignment that meets an alignment threshold.

10. The apparatus of claim 9, wherein configuring the display device to adjust at least one image output parameter includes correcting pixel spacing between the first position of the first version of the image and the second position of the second version of the image by shifting a start position of at least one of the first version of the image or the second version of the image.

11. The apparatus of claim 9, wherein the plurality of MicroLED projectors include at least the first projector for generating images in the first monochrome color, the second projector for generating images in the second monochrome color, and a third projector for generating images in a third monochrome color.

12. The apparatus of claim 11, wherein the processor is further configured to execute the instructions to:
adjust a color resolution of the plurality of MicroLED projectors, including lowering the color resolution of the first monochrome color generated by the first projector and the second monochrome color generated by the second projector, while increasing the color resolution of the third monochrome color generated by the third projector.

13. The apparatus of claim 12, wherein the first monochrome color is red color tone of the image,
wherein the second monochrome color is blue color tone of the image, and
wherein the third monochrome color is green color tone of the image.

14. The apparatus of claim 9, wherein the optical waveguide receives the first version of the image at a first input region of the optical waveguide, the first input region of the optical waveguide is physically aligned with the first projector, and
wherein the optical waveguide receives the second version of the image at a second input region of the optical waveguide, the second input region of the optical waveguide is physically aligned with the second projector.

15. The apparatus of claim 14, wherein the first input region and the second input region are configured to independently receive the first version of the image and the second version of the image, respectively, and wherein the optical waveguide further includes a plurality of diffractive optical elements configured to combine the first version of the image and the second version of the image to form a final image.

16. The apparatus of claim 9, wherein the display device is a head mounted display (HMD) device, and further comprising outputting the image toward a target.

17. A non-transitory computer readable medium storing instructions, executable by a processor, for calibrating an image on a display device, comprising instructions for:
detecting, at a camera, light rays output from an optical waveguide, wherein the light rays correspond to a plurality of monochrome color versions of an image generated by a plurality of monolithic micro light emitting diode (MicroLED) projectors;
determining a first position of a first version of the image from the plurality of monochrome color versions of the image, wherein the first version of the image is generated in first monochrome color by a first projector;
determining a second position of a second version of the image from the plurality of monochrome color versions of the image, wherein the second version of the image is generated in second monochrome color by a second projector;
measuring an image displacement between the first position of the first version of the image and the second position of the second version of the image to calculate an offset value between the first position and the second position, wherein the image displacement is one or both of lateral displacement or angular rotational displacement; and
configuring the display device to adjust at least one image output parameter of the plurality of MicroLED projectors such that the output from the optical waveguide of the plurality of monochrome color versions of the image have an overlapping alignment that meets an alignment threshold.

18. The computer readable medium of claim 17, wherein configuring the display device to adjust at least one image output parameter includes correcting pixel spacing between the first position of the first version of the image and the second position of the second version of the image by shifting a start position of at least one of the first version of the image or the second version of the image.

19. The computer readable medium of claim 17, wherein the plurality of MicroLED projectors include at least the first projector for generating images in the first monochrome color, the second projector for generating images in the second monochrome color, and a third projector for generating images in a third monochrome color.

\* \* \* \* \*